US007465140B2

(12) United States Patent  
Pronovost et al.

(10) Patent No.: US 7,465,140 B2
(45) Date of Patent: Dec. 16, 2008

(54) BALE HANDLER AND METHOD OF OPERATING ASSOCIATED THERETO

(75) Inventors: Normand Pronovost, St-Tite (CA); Réjean Pronovost, St-Tite (CA); Christian Champagne, St-Tite (CA); Sébastien Audy, St-Thècle (CA)

(73) Assignee: Les Machineries Pronovost Inc., St-Tite, Quebec (CA)

( * ) Notice: Subject to any disclaimer, the term of this patent is extended or adjusted under 35 U.S.C. 154(b) by 413 days.

(21) Appl. No.: 11/173,011

(22) Filed: Jun. 30, 2005

(65) Prior Publication Data

US 2006/0045657 A1    Mar. 2, 2006

(30) Foreign Application Priority Data

Jun. 30, 2004  (CA) ................................ 2472881
Feb. 22, 2005  (CA) ................................ 2498254

(51) Int. Cl.
*A01D 87/12*    (2006.01)

(52) U.S. Cl. ........................ 414/111; 414/813
(58) Field of Classification Search ............... 414/24.5, 414/812, 813, 111
See application file for complete search history.

(56) References Cited

U.S. PATENT DOCUMENTS

| | | | | |
|---|---|---|---|---|
| 4,370,796 A | * | 2/1983 | Wilson | 29/564.3 |
| 4,537,548 A | * | 8/1985 | Lockhart | 414/24.5 |
| 5,340,259 A | * | 8/1994 | Flaskey | 414/24.5 |
| 5,607,274 A | * | 3/1997 | Cook | 414/111 |
| 6,312,205 B1 | * | 11/2001 | Vandenberg | 414/24.5 |
| 6,811,367 B2 | * | 11/2004 | Ellis | 414/111 |
| 7,004,706 B1 | * | 2/2006 | Wilson | 414/111 |

OTHER PUBLICATIONS

The Reman Bale Stacker by: Weber-Lane Manufacturing, Reman Sales and Service, R.R. 4, Listowel, ON N4W 3G9, website: www.remansales.com/balestacker.php.
Auto Align Bale Runner by: ProAG Designs (USA) Inc., 5660 Kessler Road, Belgrade, Montana 59714, website: www.proagdesigns.com.
Arcusin by: Arcusin, Carretera, s/n-La Fuliola-Lleida (Spain).
Stinger by: Stinger Ltd., 8905 Industrial Dr.-Haven, KS 67543, website: www.stingerltd.com.

(Continued)

*Primary Examiner*—Charles A Fox
(74) *Attorney, Agent, or Firm*—Merchant & Gould P.C.

(57) ABSTRACT

An apparatus for handling and loading bales. The apparatus comprises a wheeled base frame for traveling over a ground surface provided with bales, the wheeled base frame having opposite front and rear sections, and opposite side sections, the wheeled base frame including a main platform for receiving bales to be loaded thereon. The apparatus further comprises a manipulating assembly projecting from a side section of the wheeled base frame for individually grabbing bales positioned on the ground surface and individually loading the same onto the main platform so as to form a given row of bales transversally across the main platform, on a front portion thereof. The apparatus further comprises a displacing assembly for displacing the given row of bales longitudinally along the main platform, from the front to a rear portion thereof. A method for handling and loading bales using the above apparatus is also provided.

15 Claims, 7 Drawing Sheets

OTHER PUBLICATIONS

Inland by: Inland, 675 Washington Ave., Winnipeg, MB, R2K 1M4, website: www.buhler.com.
Mil-Stak (Patent Pending) by: Mil-Stak Inc., 1350 Glenway-Fruitland, ID 83619.
American Eagle by: Circle C Equipment, L.L.C., 333 E. Feedville Rd., Hermiston, OR 97838, website: www.superhaytoday.com.
Ritchie by: David Ritchie Implements Ltd., Carseview Road, Suttieside, Forfar DD8 3BT, Scotland, website: www.ritchie-uk.com.
Sachsen Delitzsch BLW 2.2 by: Delitzscher Landtechnik u. Maschinenbau GmbH Am Anger 1, 04509 Dobernitz (Sachsen).

* cited by examiner

BALE HANDLER AND METHOD OF OPERATING ASSOCIATED THERETO

FIELD OF THE INVENTION

The present invention relates to an apparatus for handling and loading bales, commonly known as a "bale handler". More particularly, the present invention relates to a bale handler, which in its intended preferred use, is a self-loading bale handler particularly useful for manipulating, handling and loading bales of square or rectangular configurations. The present invention also relates namely to the method of operating the bale handler, i.e. a method a handling and loading bales. The apparatus is particularly useful in the field of agriculture, harvesting, and the like. The present patent application claims priority of CA 2,472,881 filed Jun. 30, 2004, and of CA 2,498,254 filed Feb. 22, 2005, the contents of which are incorporated herein by reference.

BACKGROUND OF THE INVENTION

Bale handlers have existed for several years now and are very well known in the art. Indeed, it is well known that conventional bale handlers use different types of handling and loading principles in order to load bales onto a given platform. A first conventional principle thereof results in the forming of a roll of bale without any grappler. Essentially, the bale is loaded onto a given arm and then tilted over onto the platform one by one.

A second conventional principle known in the art resides in the formation of two rolls without the use of a grappler. Essentially, the bales are sufficiently small to be accumulated two at a time on a given arm and are then tilted over onto a given platform in a superimposed configuration.

A third conventional principle thereof resides in the formation of two rolls of bale with the use of a grappler. Indeed, the bales which are typically handled in such a manner are generally too voluminous to be accumulated two at a time on a given arm. A first row is loaded on the platform and after having raised the same with the grappler, a second row is loaded onto the platform under the first row of bales.

Finally, a fourth conventional principle thereof resides in the formation of three rows of bales with a grappler. Essentially, a first row is loaded onto the platform and after having raised it with a grappler, two bales are accumulated on the arm and are then loaded onto the platform under the first row of bales.

It is also well known in the art that the above-mentioned conventional methods of handling and loading bales present substantial drawbacks in that they do not enable for an easy, convenient, effective and cost-effective loading of bales, nor do they enable a loading principle or loading apparatus which is self-loading.

Hence, in light of the aforementioned, there is a need for an improved apparatus which, by virtue of its design and components, would be able to overcome some of the aforementioned prior art problems.

SUMMARY OF THE INVENTION

The object of the present invention is to provide an apparatus or "bale handler" which satisfies some of the above-mentioned needs and which is thus an improvement over other related bale handlers known in the prior art.

In accordance with the present invention, the above object is achieved, as will be easily understood, with an apparatus for handling and loading bales, the apparatus comprising:

a wheeled base frame for traveling over a ground surface provided with bales to be handled and loaded, the wheeled base frame having opposite front and rear sections, and opposite side sections, the wheeled base frame including a main platform for receiving bales to be loaded thereon;

a manipulating assembly projecting from a side section of the wheeled base frame for individually grabbing bales positioned on the ground surface and individually loading the same onto the main platform so as to form a given row of bales transversally across the main platform, on a front portion thereof; and a displacing assembly for displacing the given row of bales longitudinally along the main platform, from the front portion to a rear portion thereof.

Preferably, the wheeled base frame further comprises a grappling assembly for grappling and raising the given row of bales from a lowered position on the front portion of the main platform to a raised position above the front portion of the main platform.

Preferably also, the manipulating assembly comprises a gripping assembly for individually gripping bales positioned on the ground surface.

Preferably also, the front section of the wheeled base frame is connectable to a hauling vehicle.

Preferably also, the manipulating assembly further comprises a relaying assembly, said relaying assembly cooperating with the gripping assembly for receiving a given bale gripped by the gripping assembly, and relaying the same onto the front portion of the main platform so as to form the given row of bales transversely across the main platform via a succession of bales individually loaded onto said main platform.

Preferably also, the main platform is pivotably movable with respect to the wheeled base frame by means of a raising assembly such that when in a tilted configuration, row of bales stacked on the main platform are slidably released via the rear section thereof.

Preferably also, the main platform is enclosed by fences provided along segments of the side sections of the main platform, and the displacing assembly is positioned at the front section of said main platform.

Preferably also, the displacing assembly comprises a pushing wall shaped and sized for pushing against rows of bales stacked on the main platform, said pushing wall being movable longitudinally along the main platform for displacing said rows of bales from the front portion of the main platform to the rear portion thereof.

According to another aspect of the present invention, there is also provided a method of handling and loading bales, the method comprising the steps of:

a) providing an apparatus such as the one briefly described herein and such as the one exemplified in the accompanying drawings;

b) displacing the apparatus over a ground surface provided with bales to be handled and loaded;

c) individually grabbing a plurality of bales positioned on the ground surface and individually loading the same sequentially onto the main platform by means of the manipulating assembly so as to form a given row of bales transversally across the main platform, on the front portion thereof; and d) displacing by means of the displacing assembly each row of bales longitudinally along the platform, from the front portion to the rear portion thereof, for vacating the front portion of the main platform so as to receive another row of bales.

Preferably, step b) further comprises the steps of:
i) grappling the given row of bales by means of the grappling assembly and raising said given row of bales from a lowered position on the front portion of the platform to a raised position above the front portion of the platform;
ii) individually grabbing another plurality of bales positioned on the ground surface and individually loading the same sequentially onto the main platform by means of the manipulating assembly so as to form another given row of bales transversally across the main platform, on the front portion thereof; and
iii) releasing the given row of bales by means of the grappling assembly and stacking the same onto said another given row of bales.

Preferably also, the method further comprises the step of tilting the main platform with respect to the wheeled base frame by means of a raising assembly for slidably releasing the bales stacked on the main platform via the rear section thereof.

Preferably also, step b) further comprises the step of advancing the apparatus when the main platform is in a tilted configuration.

According to another aspect of the invention, displacement of the apparatus is effected by displacement means known in the art, including a hauling vehicle attached to the front section of the wheeled base frame or motorized displacement means directly integrated to the apparatus such that the apparatus can travel autonomously across a field without being pulled by a hauling vehicle.

According to another aspect of the invention, there is also covered a hauling vehicle provided with an apparatus such as the one briefly described herein and such as the one exemplified in the accompanying drawings. The hauling vehicle is typically a tractor, but may consist of any other suitable hauling vehicle.

According to another aspect of the present invention, there is also provided a kit for modifying a conventional wheeled base trailer frame into an apparatus according to the present invention.

According to yet another aspect of the present invention, there is also provided a method of assembling the above-mentioned kit.

According to yet another aspect of the present invention, there is also provided a stack of rolls of bales having been loaded with the above-mentioned apparatus and/or method.

The objects, advantages and other features of the present invention will become more apparent upon reading of the following non-restrictive description of preferred embodiments thereof, given for the purpose of exemplification only with reference to the accompanying drawings.

DETAILED DESCRIPTION OF PREFERRED EMBODIMENTS OF THE INVENTION

In the following description, the same numerical references refer to similar elements. The embodiments shown in the figures are preferred.

Moreover, although the present invention was primarily designed for use with square or rectangular bales, and to be hauled by a tractor for agricultural, harvesting and other like applications, it may be used with other types of transportation vehicles and objects, and in other fields, as apparent to a person skilled in the art. For this reason, expressions such as "square", "rectangular", "bale", "tractor", "agriculture", "harvesting", etc., used herein should not be taken as to limit the scope of the present invention and includes all other kinds of objects or fields with which the present invention could be used and may be useful.

Moreover, in the context of the present invention, the expressions "apparatus", "device", "assembly", "handler", and any other equivalent expression and/or compound words thereof known in the art will be used interchangeably. Furthermore, the same applies for any other mutually equivalent expressions, such as "bale", and "row of bales", or "grappling", "hooking" and "holding", as well as "square" and "rectangular", for example, as also apparent to a person skilled in the art.

In addition, although the preferred embodiment of the present invention as illustrated in the accompanying drawings may comprise various components, and although the preferred embodiment of the apparatus as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the apparatus and corresponding parts according to the present invention, as will be briefly explained hereinafter and as can be easily inferred herefrom, without departing from the scope of the invention.

Broadly described, the present invention, as illustrated in the accompanying drawings, relates to an apparatus for handling and loading bales, which is commonly known as a "bale handler", such as the ones typically used for agricultural, harvesting, and like applications. Typically, the bale handler is hauled by a hauling vehicle, such as a tractor for example. It is worth mentioning though that, as apparent to a person skilled in the art, other suitable hauling vehicles may be used for displacing the apparatus about a train containing bales to be handled and loading onto the apparatus. Furthermore, displacement of the apparatus can be effected by any other displacement means known in the art, including a motorized displacement means directly integrated to the apparatus such that the apparatus can travel autonomously across a field without being pulled by a hauling vehicle.

Figure 1:
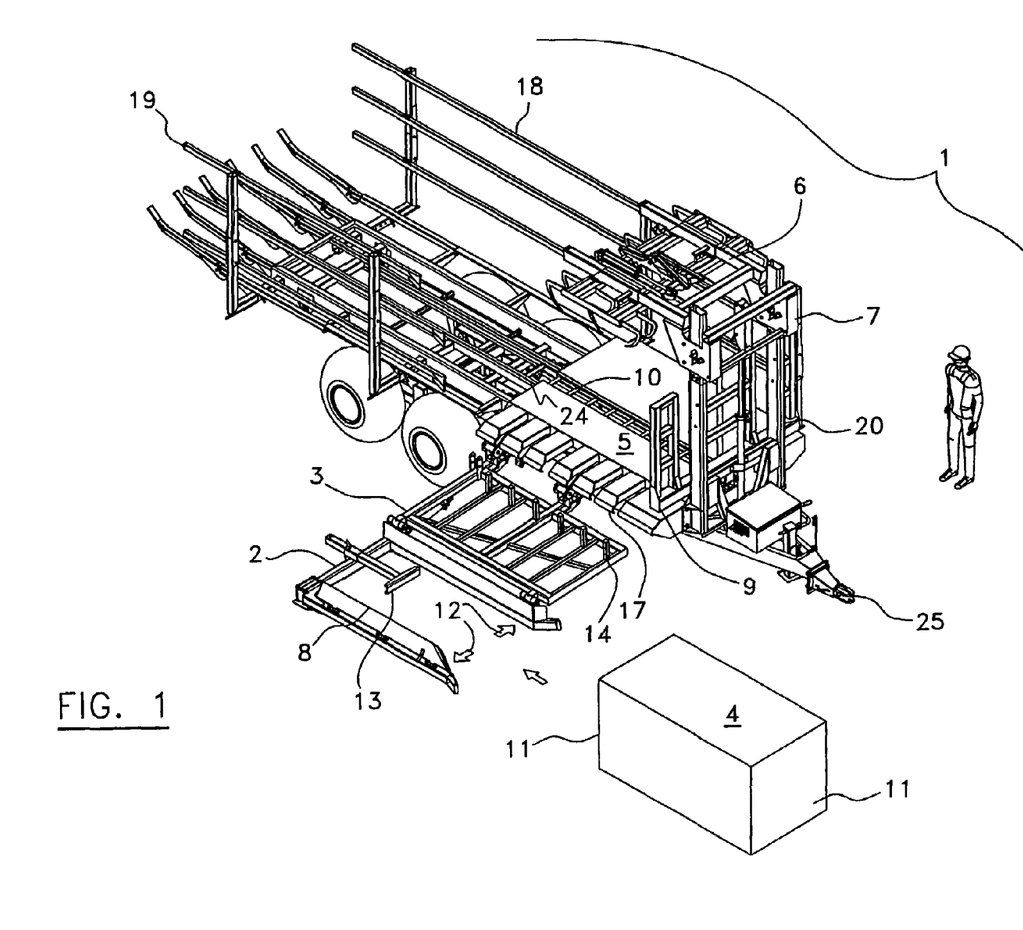
FIG. 1 is a top perspective view of an apparatus according to a preferred embodiment of the present invention, the apparatus being shown adjacent to an individual and in relation to a bale to be handled and loaded onto the main platform of the apparatus.

The apparatus comprises a wheeled base frame for traveling over a ground surface provided with bales to be handled and loaded, the wheeled base frame having opposite front and rear sections, and opposite side sections, the wheeled base frame including a main platform for receiving bales to be loaded thereon, as can be easily understood when referring to FIG. 1.

The apparatus also comprises a manipulating assembly projecting from a side section of the wheeled base frame for individually grabbing bales positioned on the ground surface and individually loading the same onto the main platform so as to form a given row of bales transversally across the main platform, on a front portion thereof.

The apparatus also comprises a displacing assembly for displacing the given row of bales longitudinally along the main platform, from the front portion to a rear portion thereof.

List of Reference Numbers Used for Preferred Embodiments Illustrated in the Accompanying Drawings 1. wheeled base frame
2. cross member
3. first side of the relaying assembly
4. bale
5. main platform (front portion thereof)
6. grappling assembly
7. carriage of grappling assembly
8. choker
9. pushing wall of the displacing assembly
10. carriage of the displacing assembly
11. extremity of the bale
12. anti-space defined within the U-shaped frame of the gripping assembly, as delimited by the cross-member and opposite first and second members
13. device or abutment device of the cross-member for detecting presence of the bale within the anti-space defined
14. abutment flanges provided adjacent to a second side of the relaying assembly
15. starting position of the relaying assembly
16. starting position of the gripping assembly
17. opening in the main platform
18. left fence or side panel
19. right fence or side panel
20. vertical post of the grappling assembly
21. opened grappler
22. closed grappler
23. starting position of the grappling assembly
24. tunnel of the pushing wall
25. anchoring means of the front section of the wheeled base frame for connecting onto a hauling device As shown in the accompanying drawings, the wheeled base frame preferably comprises a grappling assembly for grappling and raising the given row of bales from a lowered position on the front portion of the main platform to a raised position above the front portion of the main platform. Preferably also, the grappling assembly comprises a carriage assembly slidably movable along vertical posts provided on the front section of the wheeled base frame, the carriage assembly including a grappler positioned above the front portion of the main platform and being configured for removably grappling a given row of bales therefrom.

Preferably also, the manipulating assembly comprises a gripping assembly for individually gripping bales positioned on the ground surface, and preferably further comprises a relaying assembly, said relaying assembly cooperating with the gripping assembly for receiving a given bale gripped by the gripping assembly, and relaying the same onto the front portion of the main platform so as to form the given row of bales transversely across the main platform via a succession of bales individually loaded onto said main platform.

Preferably also, the front section of the wheeled base frame is connectable to a hauling vehicle.

Figure 5:
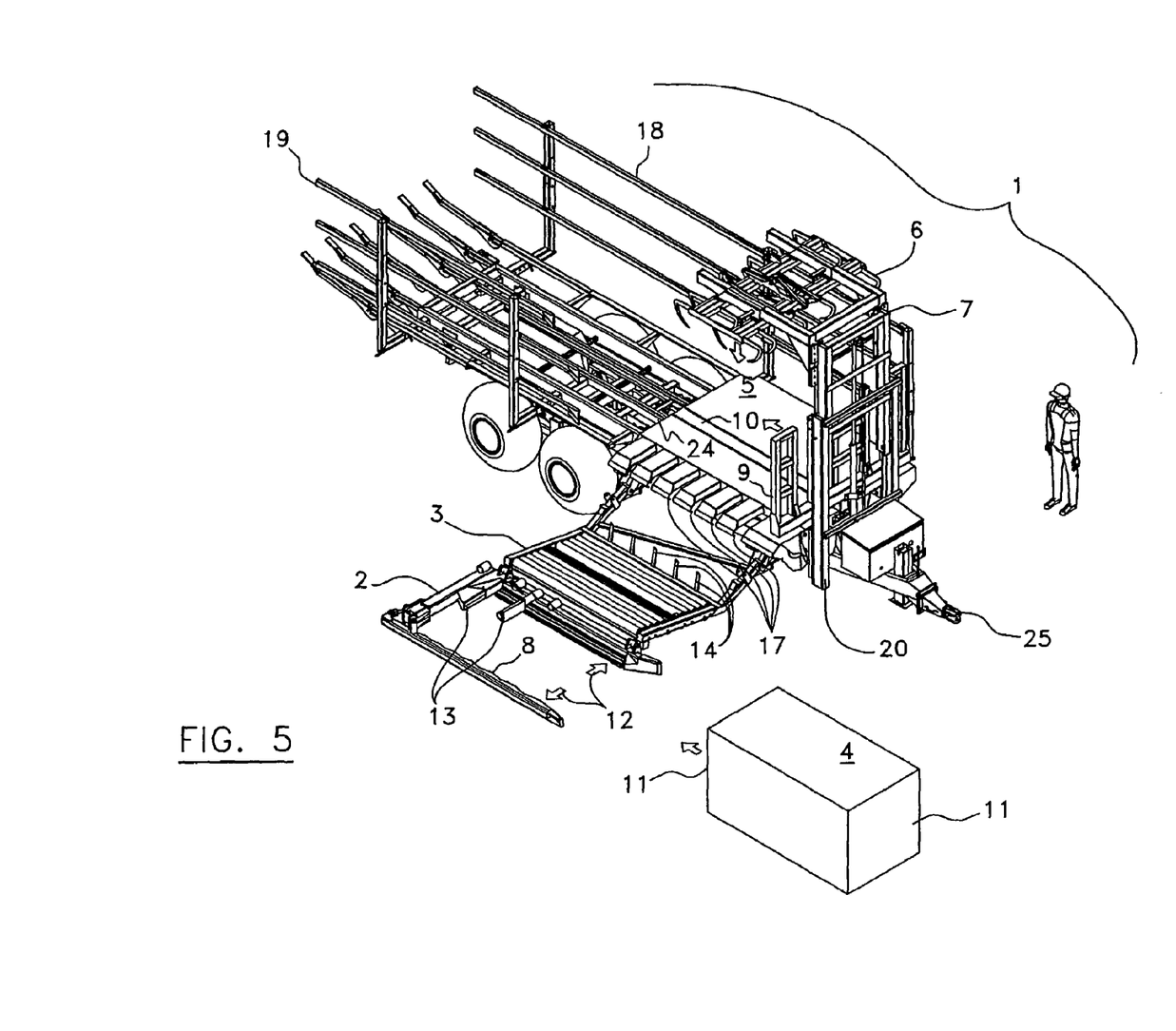
FIG. 5 is a top perspective view of an apparatus according to another preferred embodiment of the present invention, the apparatus being shown adjacent to an individual and in relation to a bale to be handled and loaded onto the main platform of the apparatus.
Figures 6, 7:
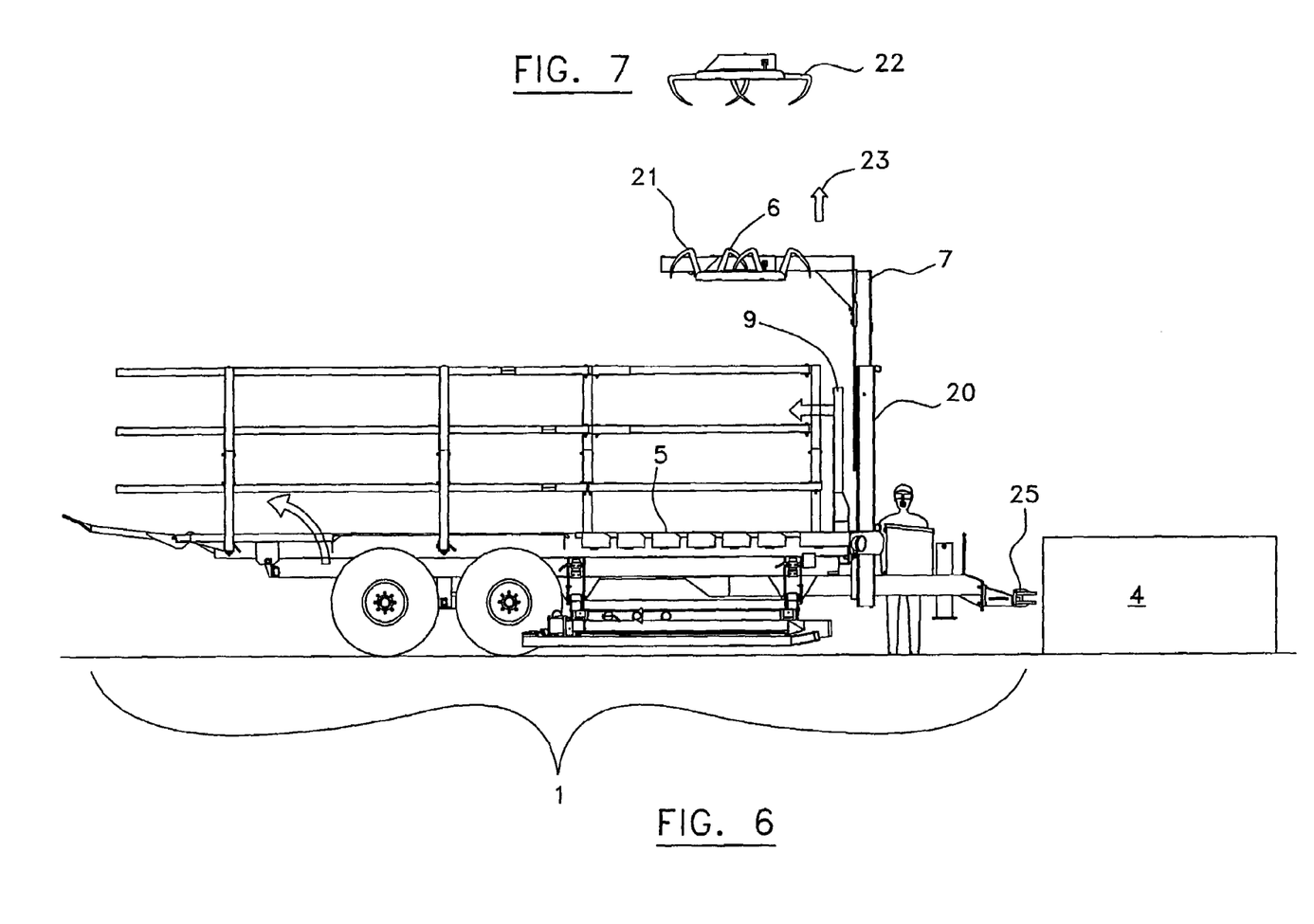
FIG. 6 is a side view of what is shown in FIG. 5.
FIG. 7 is a side view of the grappler of the grappling assembly of FIG. 6 when in a grappling configuration.
Figure 8:
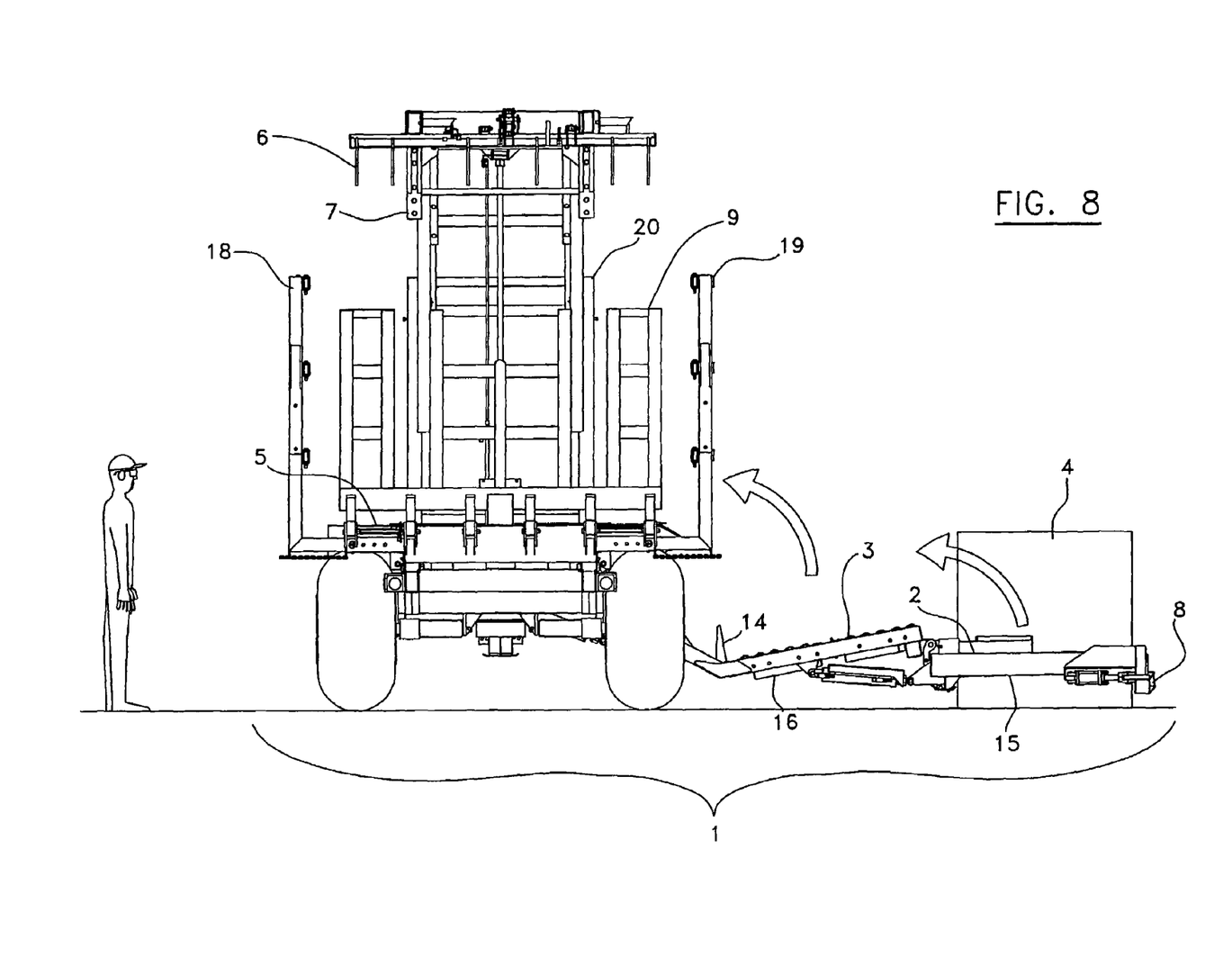
FIG. 8 is rear view of what is shown in FIG. 6, the apparatus being now shown cooperating with a bale to be handled and loaded onto the main platform of the apparatus.

According to the preferred embodiment of the present invention, and as better shown in FIGS. 1 and 5, the gripping assembly comprises a substantially U-shaped frame including opposite first and second members extending substantially along the side section of the wheeled base frame, and a cross member extending between the first and second members, the U-shaped frame being pivotally movable with respect to the side section of the wheeled base frame and defining a space for receiving therein a given bale positioned on the ground surface and to be loaded onto the main platform. Preferably also, the cross-member of the U-shaped frame is provided with a device for detecting when a given bale is contained within the space defined by the U-shaped frame. Detection may also be done manually through visual inspection by an operator of the apparatus. The U-shaped frame preferably comprises a chocker for choking the given bale once it is inserted into the space defined by the U-shaped frame.

Figure 4:
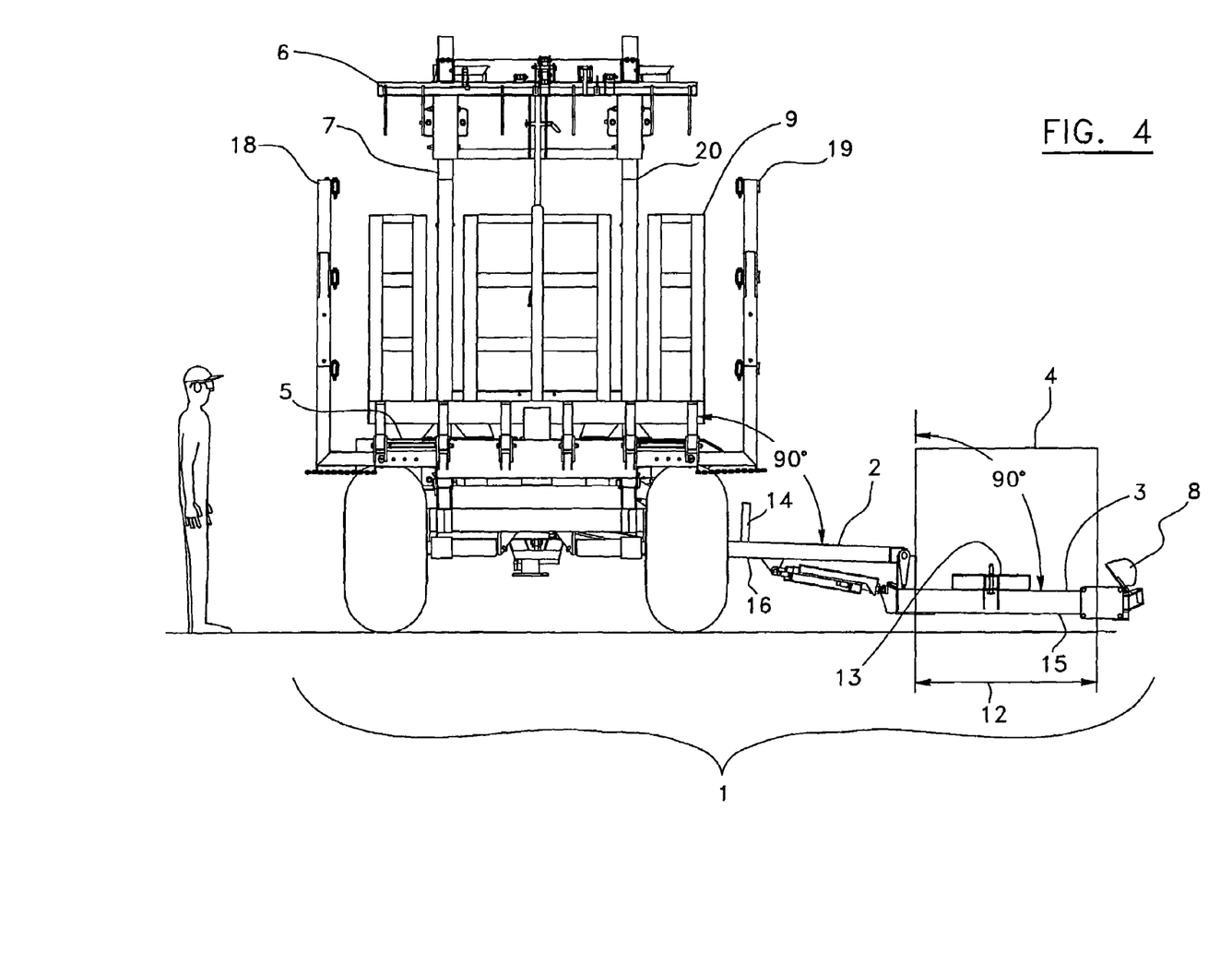
FIG. 4 is rear view of what is shown in FIG. 2, the apparatus being now shown cooperating with a bale to be handled and loaded onto the main platform of the apparatus.
Figure 9:
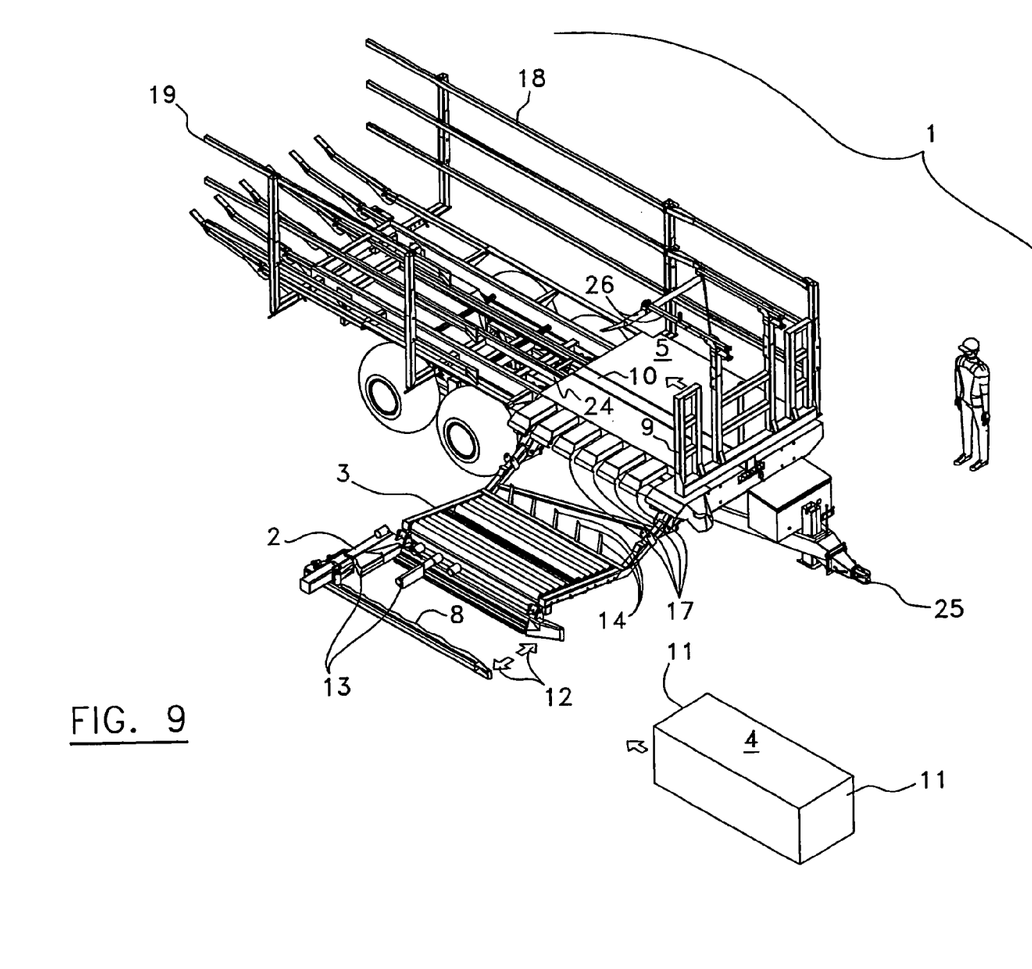
FIG. 9 is a top perspective view of an apparatus according to yet another preferred embodiment of the present invention, the apparatus being shown adjacent to an individual and in relation to a bale to be handled and loaded onto the main platform of the apparatus, and provided with a ball guide instead of a grappling assembly.

As previously mentioned, and as can be easily understood when relating to FIGS. 4 and 9, the apparatus preferably comprises a relaying assembly which preferably comprises an intermediate platform, said intermediate platform cooperating with the U-shaped frame of the gripping assembly and being positioned, shaped and sized with respect thereto, for receiving a given bale gripped by the gripping assembly via a pivotal movement of the U-shaped frame towards the intermediate platform.

According to the preferred embodiment of the present invention, the relaying assembly is further positioned, shaped and sized with respect to the wheeled base frame so as to relay a given bale received from the U-shaped frame of the gripping assembly onto the front portion of the main platform via a pivotal movement of the intermediate platform towards the main platform. Preferably also, the intermediate platform has a first side hingedly connected to the second member of the U-shaped frame, and is pivotally movable with respect thereto via a rotation of about 90 degrees, and the intermediate platform has a second side, opposite to the first side thereof, being hingedly connected to the wheeled base frame, and is pivotally movable with respect thereto via a rotation of about 90 degrees.

According to another preferred aspect of the present invention, the main platform is pivotally movable with respect to the wheeled base frame by means of a raising assembly such that when in a tilted configuration, row of bales stacked on the main platform are slidably released via the rear section thereof.

Preferably also, the main platform is enclosed by fences or side panels provided along segments of the side sections of the main platform, and wherein the displacing assembly is positioned at the front section of said main platform.

Figures 2, 3:
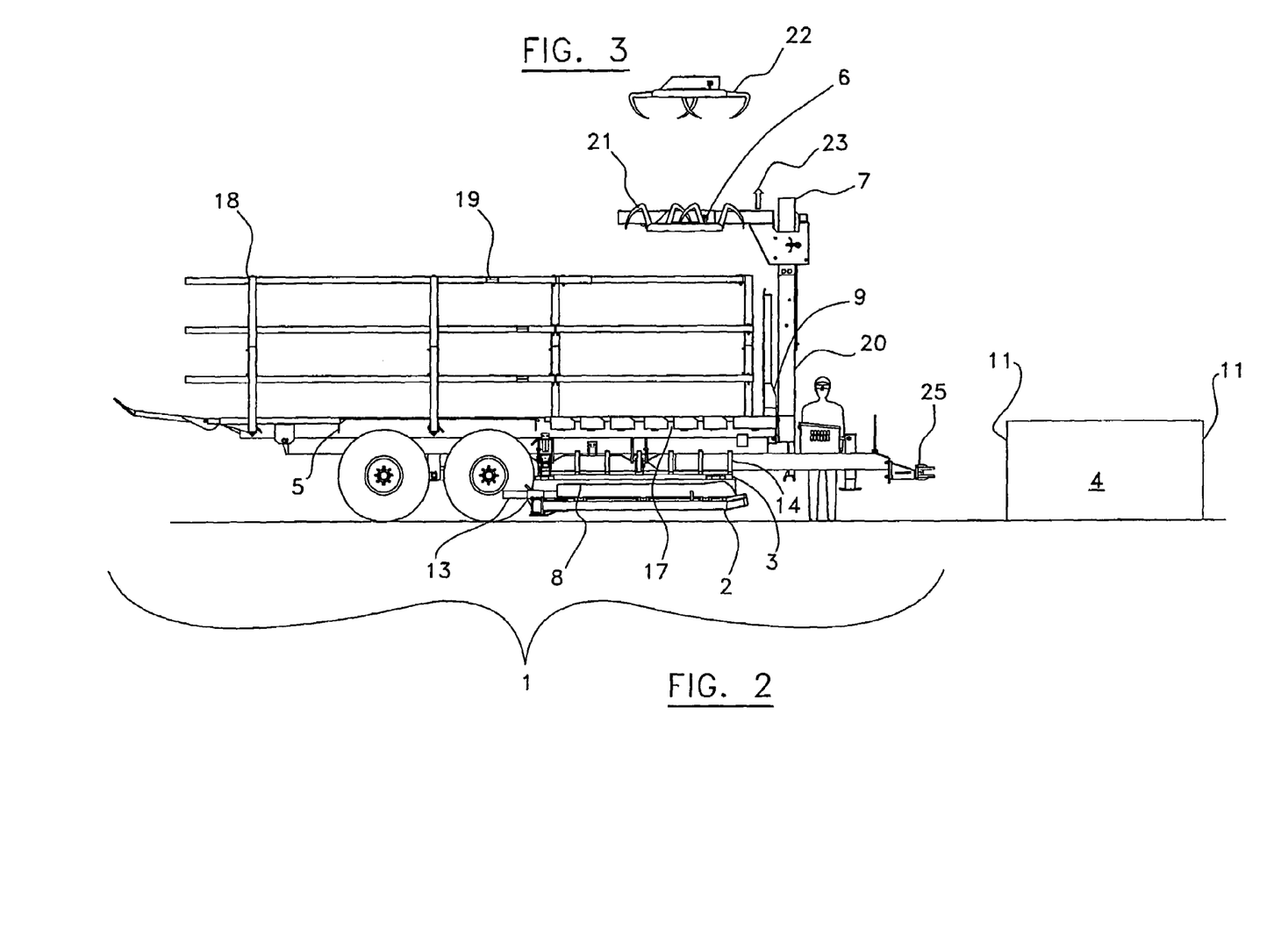
FIG. 2 is a side view of what is shown in FIG. 1.
FIG. 3 is a side view of the grappler of the grappling assembly of FIG. 2 when in a grappling configuration.

As better shown in FIGS. 1 and 2, the displacing assembly preferably comprises a pushing wall shaped and sized for pushing against rows of bales stacked on the main platform, said pushing wall being movable longitudinally along the main platform for displacing said rows of bales from the front portion of the main platform to the rear portion thereof.

According to the present invention, the different assemblies of the apparatus are preferably activated by actuators selected from the group of hydraulic cylinders, pneumatic pistons and the like. It is worth mentioning though that the different assemblies of the apparatus according to the present invention may be activated by other suitable means enabling a relative displacement between the assemblies in order to achieve the desired end results, as explained hereinabove, and as also apparent to a person skilled in the art.

According to another aspect of the present invention, there is also provided a method of handling and loading bales. The method comprises the steps of: a) providing an apparatus such as the one briefly described herein and such as the one exemplified in the accompanying drawings; b) displacing the apparatus over a ground surface provided with bales to be handled and loaded; c) individually grabbing a plurality of bales positioned on the ground surface and individually loading the same sequentially onto the main platform by means of the manipulating assembly so as to form a given row of bales transversally across the main platform, on the front portion thereof; and d) displacing by means of the displacing assembly each row of bales longitudinally along the platform, from the front portion to the rear portion thereof, for vacating the front portion of the main platform so as to receive another row of bales.

Preferably, step b) further comprises the steps of: i) grappling the given row of bales by means of the grappling assembly and raising said given row of bales from a lowered position on the front portion of the platform to a raised position above the front portion of the platform; ii) individually grabbing another plurality of bales positioned on the ground surface and individually loading the same sequentially onto the main platform by means of the manipulating assembly so as to form another given row of bales transversally across the main platform, on the front portion thereof; and iii) releasing the given row of bales by means of the grappling assembly and stacking the same onto said another given row of bales.

Preferably also, the method further comprises the step of tilting the main platform with respect to the wheeled base frame by means of a raising assembly for slidably releasing the bales stacked on the main platform via the rear section thereof.

Preferably also, step b) further comprises the step of advancing the apparatus when the main platform is in a tilted configuration.

As briefly explained hereinabove, and as may now be better appreciated, the present invention relates to a apparatus or trailer, commonly known as a bale handler, which facilitates the loading of bales of hay, straw, and the like, particularly those of square or rectangular configuration, and of variable dimensions, for then transporting the same from one point, namely the ground surface, to another point, without having to use any other equipment other than the one integrated to the apparatus according to the present invention, which is preferably anchored to a hauling vehicle, such as a farm tractor or any other suitable tractor vehicle or hauling vehicle.

The apparatus or trailer, as explained hereinabove, is preferably equipped with a four arm or cross-member provided with a choker which is preferably devised so as to pivot the bales on a lateral arm, or first side of the intermediate assembly, so as to enable to accumulate one or several balls according to the dimension thereof for then tilting them over onto the main platform. After a first cycle of the arm, the following loading cycles are brought to rest against the subsequent bales on the preceding bales to push them transversely across the main platform, towards the left side panel, until the main platform is full along its entire width. In the case where two bales are accumulated onto the arm or first side of the intermediate platform, the bales will be positioned in a superimposed manner onto the main platform. If the loading capacity of the machine allows it, preferably up to three rolls of bales can be stacked by means of the grappling assembly. Firstly, and according to a preferred embodiment of the present invention, a single bale is accumulated on the arm and then relayed and loaded onto the main platform until the latter is filled about its entire width so as to form a first given row of bales, this first given row of bales being then preferably raised by the grappling assembly which is preferably assembled onto a carriage with vertical displacement along corresponding vertical posts. Subsequently, two bales accumulated on the arm can be inserted under the first row enabling to superimposed three rows of bales, as can be easily understood when referring to the accompanying drawings. The grappling assembly and its corresponding carriage are preferably demountable in order to alleviate the machine in terms of weight when they are not in use. A pushing wall is preferably mounted onto another corresponding carriage being horizontally displaceable in a back and forth motion along the main platform so as to enable to displace the one or the plurality of superimposed rows of bales towards the rear portion of the platform, as can be easily understood when referring to FIG. 1 for example. The operation is repeated until the main platform is full about its entire length, and/or until all the bales of the group surface to be loaded have been treated. As previously explained, the unloading of the main platform is preferably carried out by inclining the main platform rearwardly so that the bales may be slidably released through the rear section thereof by means of gravity.

Described hereinbelow is a brief description of a complete loading cycle according to a preferred embodiment of the present invention.

Indeed, as may now be better appreciated in view of the above-discussed, upon approach of a bale of hay or other like material, located in a agricultural field or other, the operator, by advancing with the tractor vehicle directs the anti-space between the cross-member and first and second members which are both at their initial position on one or the other of the extremity of the bale. Without necessitating to stop, the operator advances until the end of the bale abuts the projection located at the rear of the arm or cross-member, and then activates the raising of this forearm or cross-member by means of a manual electro-hydraulic function, which is operatively connected between the gripping assembly and the relaying assembly so as to have as an effect the raising of the cross-member too. This arm is preferably lighted with a choker that, preferably by gravity, is biased downwardly and is limited to a horizontal position. When the bale penetrates into the arm 2 and the forearm or cross-member 3, the choker is raised by the bale which is much heavier than it is. As a result thereof, when the arm 2 is raised, the choker 8 rests itself on a side of the bale along its entire length and pushes the bale until it rests against the second arm 3 of the other side and the weight of the bale increases the tension in the choker 8 which tightens more and more the bale and thus the bale is raised by means of the member when the gripping assembly is pivoted towards the relaying assembly.

After having raised the bale a few inches from the ground surface, the operator activates another preferred electro-hydraulic function but in a same sequence which is not automated will pivot the cross arm 2 onto the second arm 3 up until the bale has as an effect a pivot of about 90° with respect to the second arm 3, then this second arm is preferably raised of 45° with respect to the main platform 5, which enables the bale to free itself on the choker 8 and from the members by sliding onto the second member 3 by gravity up until projections 14 of the forearm, provided on the second side of the relaying assembly, as better shown in FIG. 1. Subsequently, the arm or gripping assembly 2 returns to its starting position and the forearm or relaying assembly 3 restarts its trajectory up until about 90° with respect to the above of the main platform 5. The projections 14 of the relaying assembly, when pivoting, pass through corresponding opening 17 defined in the main platform 5 and, the relaying assembly 3 by pushing the bale on the main platform distances the bale from the projections 14 which enables to the projections 14 to now interfere with the bale when the relaying assembly 3 restarts its descent towards its starting position 16.

On the main platform 5, two or three bales can be accumulated side to side depending on their width. For example, if the main platform measures about 96 inches in width, then about two bales of approximately 48 inches can be accumulated side by side.

In order to load a second or a third bale, the previously described steps are to be repeated and the bale in the course of lowering will come and rest against the or the plurality of bales already loaded and will push the latter until the width of the main platform is fulfilled and that the first bale be rested against the left fence or side panel.

Once a first row of bales has been completed, the operator activates another preferred electro-hydraulic function that in the same sequence completely automized will make the grappler 6 which is preferably fixed to a corresponding carriage 7 come down and be guided by a corresponding vertical post 20, the grappler being preferably in a starting position 23 as well as in opened configuration 21. When the grappler comes into contact with the bales, a corresponding signal will activate the grappler 22 into a closed or hooking configuration and then the grappler is drawn upwards to its starting position with the bales being grappled therein, which allows the necessary space in order to load another second row of bales under the first.

The loading of the second row of bales is carried out in a sequence similar to that of a first row of bales, as discussed above.

Once the second row of bales has been loaded, the operator of the apparatus activates another preferred electro-hydraulic function which in a same sequence which is preferably automized will make the grappler come down so that the first row of bales comes into contact with the second row of bales and then the grappler is preferably returned to its opened position in order to free the bales and come up to its starting position 23.

A first block of two rows of bales is now loaded. Depending on the length of the bales, a different number of bales can be loaded in order to fulfill the available space on the main platform 5. For example, if the main platform measures 24 feet in length and that the bales measures about 8 feet in length, then the platform will be able to contain three blocks of bales from end to end.

In order to displace a first block of bales towards the rear, the operator activates another preferred electro-hydraulic function which in a completely automized same sequence will make the push wall 9 which is preferred fixed to a corresponding carriage 10 move rearwardly and be guided by a corresponding tunnel until the push wall is drawn back about the length of the block of bales so as to enable the loading of another block of bales, and then the push wall is returned to its starting position. The operation is repeated until the platform be completed about its entire length and/or until all the necessary bales on the given group surface have been handled and loaded onto the platform.

Once the loading is complete, the operator will displace the apparatus to the place of warehousing of the bales, and then preferably activates another manual electro-hydraulic function which will tilt the main platform towards the rear, at an angle with respect to the wheeled base frame which is preferably sufficient so as to enable the bales to slide out from the rear section of the frame via gravity, as the wheeled base frame is preferably advances with the hauling vehicle.

As may now be appreciated, the present invention is a substantial improvement over other related bale handlers known in the prior art in that, by virtue of its design and components, the apparatus according to the present invention overcomes several of the prior art problems.

More particularly, the apparatus according to the present invention is a self-loading bale handler.

Of course, numerous modifications could be made to the above-described embodiments without departing from the scope of the invention as defined in the appended claims.

The invention claimed is:

1. An apparatus for handling and loading bales, the apparatus comprising:

a wheeled base frame for traveling over a ground surface provided with bales to be handled and loaded, the wheeled base frame having opposite front and rear sections, and opposite side sections, the wheeled base frame including a main platform for receiving bales to be loaded thereon;

a manipulating assembly projecting from a side section of the wheeled base frame for grabbing bales positioned on the ground surface and loading the bales onto the main platform so as to form a given row of bales transversely across the main platform, on a front portion thereof; and a displacing assembly for displacing the given row of bales longitudinally along the main platform, from the front portion to a rear portion thereof;

wherein the manipulating assembly comprises a gripping assembly for gripping a given bale positioned on the ground surface;

wherein the manipulating assembly further comprises a relaying assembly, said relaying assembly cooperating with the gripping assembly for receiving each bale gripped by the gripping assembly, and relaying the bale gripped by the gripping assembly via a pivotal movement about a longitudinal axis thereof onto the front portion of the main platform so as to form the given row of bales transversely across the main platform via a succession of bales loaded onto said main platform;

wherein the gripping assembly comprises a substantially U-shaped frame including opposite first and second members extending substantially along the side section of the wheeled base frame, and a cross member extending between the first and second members, the U-shaped frame being pivotally movable about a longitudinal axis thereof with respect to the side section of the wheeled base frame and defining a space for longitudinally receiving therein the given bale positioned on the ground surface and to be loaded onto the main platform;

wherein the U-shaped frame comprises a choker for choking the given bale once it is inserted longitudinally into the space defined by the U-shaped frame; and wherein the relaying assembly comprises an intermediate platform, said intermediate platform cooperating with the U-shaped frame of the gripping assembly and being positioned, shaped and sized with respect thereto, for receiving the given bale gripped by the gripping assembly via a pivotal movement about a longitudinal axis of the U-shaped frame towards the intermediate platform.

2. An apparatus according to claim 1, wherein the wheeled base frame further comprises a grappling assembly for grappling and raising the given row of bales from a lowered position on the front portion of the main platform to a raised position above the front portion of the main platform.

3. An apparatus according to claim 2, wherein the grappling assembly comprises a carriage assembly slidably movable along vertical posts provided on the front section of the wheeled base frame, the carriage assembly including a grappler positioned above the front portion of the main platform and being configured for removably grappling a given row of bales therefrom.

4. An apparatus according to claim 1, wherein the cross-member of the U-shaped frame is provided with a device for detecting when a given bale is contained within the space defined by the U-shaped frame.

5. An apparatus according to claim 1, wherein the relaying assembly is further positioned, shaped and sized with respect to the wheeled base frame so as to relay a given bale received from the U-shaped frame of the gripping assembly onto the front portion of the main platform via a pivotal movement of the intermediate platform towards the main platform.

6. An apparatus according to claim 5, wherein the intermediate platform has a first side hingedly connected to the second member of the U-shaped frame, and is pivotally movable with respect thereto via a rotation of about 90 degrees.

7. An apparatus according to claim 6, wherein the intermediate platform has a second side, opposite to the first side thereof, being hingedly connected to the wheeled base frame, and is pivotally movable with respect thereto via a rotation of about 90 degrees.

8. An apparatus according to claim 1, wherein the main platform is pivotably movable with respect to the wheeled base frame by means of a raising assembly such that when in a tilted configuration, row of bales stacked on the main platform are slidably released via the rear section thereof.

9. An apparatus according to claim 1, wherein the main platform is enclosed by fences provided along segments of the side sections of the main platform, and wherein the displacing assembly is positioned at the front section of said main platform.

10. An apparatus according to claim 9, wherein the displacing assembly comprises a pushing wall shaped and sized for pushing against rows of bales stacked on the main platform, said pushing wall being movable longitudinally along the main platform for displacing said rows of bales from the front portion of the main platform to the rear portion thereof.

11. An apparatus according to claim 1, wherein the different assemblies of the apparatus are activated by actuators selected from the group of hydraulic cylinders, pneumatic pistons and the like, and the front section of the wheeled base frame is connectable to a hauling vehicle.

12. A method of handling and loading bales, the method comprising the steps of:
 a) providing an apparatus such as the one defined in claim 1;
 b) displacing the apparatus over a ground surface provided with bales to be handled and loaded;
 c) individually grabbing a plurality of bales positioned on the ground surface and individually loading the same sequentially onto the main platform by means of the manipulating assembly so as to form a given row of bales transversally across the main platform, on the front portion thereof; and
 d) displacing by means of the displacing assembly each row of bales longitudinally along the platform, from the front portion to the rear portion thereof, for vacating the front portion of the main platform so as to receive another row of bales.

13. A method according to claim 12, wherein step b) further comprises the steps of:
 i) grappling the given row of bales by means of the grappling assembly and raising said given row of bales from a lowered position on the front portion of the platform to a raised position above the front portion of the platform;
 ii) individually grabbing another plurality of bales positioned on the ground surface and individually loading the same sequentially onto the main platform by means of the manipulating assembly so as to form another given row of bales transversally across the main platform, on the front portion thereof; and
 iii) releasing the given row of bales by means of the grappling assembly and stacking the same onto said another given row of bales.

14. A method according to claim 12, wherein the method further comprises the step of tilting the main platform with respect to the wheeled base frame by means of a raising assembly for slidably releasing the bales stacked on the main platform via the rear section thereof.

15. A method according to claim 14, wherein step b) further comprises the step of advancing the apparatus when the main platform is in a tilted configuration.

* * * * *